US011327585B1

(12) United States Patent
Das et al.

(10) Patent No.: US 11,327,585 B1
(45) Date of Patent: May 10, 2022

(54) ADAPTIVE STYLUS RECEIVER TO ADAPTIVELY DETERMINE PRESENCE OF NARROWBAND INTERFERENCE AND ITS SUPPRESSION

(71) Applicant: CIREL SYSTEMS PRIVATE LIMITED, Bangalore (IN)

(72) Inventors: Akashdip Das, Kolkata (IN); Leela Madhav Lakkimsetti, Tubrahalli (IN)

(73) Assignee: CIREL SYSTEMS PRIVATE LIMITED, Bangalore (IN)

( * ) Notice: Subject to any disclaimer, the term of this patent is extended or adjusted under 35 U.S.C. 154(b) by 11 days.

(21) Appl. No.: 17/143,087

(22) Filed: Jan. 6, 2021

(30) Foreign Application Priority Data

Nov. 12, 2020 (IN) .............................. 202041049522

(51) Int. Cl.
*G06F 3/038* (2013.01)
*G06F 3/0354* (2013.01)
*H04B 1/10* (2006.01)

(52) U.S. Cl.
CPC ........ *G06F 3/0383* (2013.01); *G06F 3/03545* (2013.01); *H04B 1/1036* (2013.01)

(58) Field of Classification Search
CPC . G06F 3/0383; G06F 3/03545; H04B 1/1036; H04B 1/71
See application file for complete search history.

(56) References Cited

U.S. PATENT DOCUMENTS

| 7,796,694 | B1* | 9/2010 | O'Connor | H04J 13/10 |
| | | | | 370/215 |
| 8,614,940 | B1* | 12/2013 | Dybdal | H04B 15/00 |
| | | | | 370/542 |
| 10,536,161 | B1* | 1/2020 | Zhang | H03M 3/46 |
| 2013/0083876 | A1* | 4/2013 | Suzuki | H04B 1/1036 |
| | | | | 375/350 |
| 2015/0304150 | A1* | 10/2015 | Schaffner | H04L 27/2665 |
| | | | | 375/350 |

* cited by examiner

*Primary Examiner* — Bryan Earles
(74) *Attorney, Agent, or Firm* — Maschoff Brennan

(57) ABSTRACT

Disclosed is an adaptive stylus receiver to adaptively determine presence of narrowband interference. The receiver comprises an analog-to-digital converter to digitize an incoming digitally modulated (DM) signal at a predetermined sampling frequency, a digital band pass filter configured to receive digitized DM signal and to generate a first set of frequencies from the digitized DM signal, and a frequency detection logic to adaptively determine presence of narrowband interference in a first set of frequencies, the frequency detection logic configured to estimate frequency components from the first set of frequencies, provide a first set of coefficients to a narrowband notch filter, binning of coefficients for frequencies below a threshold value, adaptively estimate narrowband notch filter coefficients by binning and provide estimated narrowband notch filter coefficients to the narrowband notch filter to suppress the narrow band interference from the first set of frequencies.

18 Claims, 7 Drawing Sheets

ADAPTIVE STYLUS RECEIVER TO ADAPTIVELY DETERMINE PRESENCE OF NARROWBAND INTERFERENCE AND ITS SUPPRESSION

FIELD OF THE INVENTION

The present disclosure generally relates to a stylus, and more particularly relates to an adaptive stylus receiver to adaptively determine presence of narrowband interference and its suppression.

BACKGROUND OF THE INVENTION

In computing, stylus is a pen shaped input device that can be used to write, draw pictures or to select objects on a touchscreen panel. Some of the latest stylus communication protocols support two way communications with the touchscreen panel. The stylus has a receiver circuit which decodes the serial information sent by the touchscreen panel. Often, the serial information received by the stylus can include interference signals. This is because the electrical ground of the stylus and that of the touchscreen panel are not electrically shorted. Thus, the stylus can pick up the receive signal along with any interfering signal from the touchscreen due to the different electrical grounds of the touchscreen and the stylus. The receiver circuit in the stylus may fail to decode the signal received from the touchscreen panel. This is further explained in the following paragraphs.

Typically, the uplink communication from the touchscreen panel consists of a beacon sent to the stylus at a certain cadence. The beacons in the uplink communication is in the form of a Direct Sequence Spread Spectrum (DSSS) sequence of N chips corresponding to each bit and there are M bits in each communication packet. Each chip is of a duration of $T_{ew}$ seconds (s) and hence the total duration of $N \times M \times T_{ew}$ seconds (s). These beacons appear with a certain beacon cadence, $T_{be}$ seconds (s). The rest of the time is the idle time with respect to uplink communication and during this time, downlink communication takes place from the stylus to the touch panel. This DSSS pattern could be embedded in some narrowband interference originating from a charger connected to the touch panel for charging the batteries. In presence of a narrowband interference, signals that are low in amplitude are difficult to decode. One alternative is to increase the signal amplitude transmitted by the touchscreen. However, this increases the power consumption of the touchscreen panel.

Another method to reduce the narrowband interference is to increase the spreading of the signal by increasing the number of chips in the pseudo noise (PN) sequence to be decoded. By doing this, the signal to noise ratio (SNR) improves by $\sqrt{N}$ times, where N is the number of chips being decoded. However, this would increase the power consumption as well as the silicon area of the correlation receiver.

Further, it is to be noted that there is a compliance test by the International Electro-technical Commission called the IEC61000-4-6 Level 2 that the stylus is required to pass. This test sweeps across frequencies of a narrowband interference signal on the touchscreen panel with which the stylus is required to function without degradation in performance.

BRIEF SUMMARY OF THE INVENTION

This summary is provided to introduce a selection of concepts in a simple manner that is further described in the detailed description of the disclosure. This summary is not intended to identify key or essential inventive concepts of the subject matter nor is it intended for determining the scope of the disclosure.

The present disclosure implements a receiver that rejects a narrow band interference signal in the uplink communication between the touch panel and the stylus for communication, in any stylus protocol. Further, the present disclosure discloses a method by which the Signal to Noise Ratio may be improved further by innovatively increasing the length of the PN sequence without degradation in performance of the stylus.

The present disclosure discloses an adaptive stylus receiver to adaptively determine presence of narrowband interference. The adaptive stylus receiver comprises an analog-to-digital converter to digitize an incoming digitally modulated (DM) signal at a predetermined sampling frequency, wherein the DM signal comprises beacons and interference. The adaptive stylus receiver comprises a digital band pass filter configured to receive digitized DM signal and to generate a first set of frequencies from the digitized DM signal. The first set of frequencies is obtained by removing DC offset from the digitized DM signal, and attenuating frequencies above a cut-off frequency from the digitized DM signal. The adaptive stylus receiver comprises a frequency detection logic to adaptively determine presence of narrowband interference in the first set of frequencies. The frequency detection logic is configured to estimate frequency components from the first set of frequencies, provide a first set of coefficients to a narrowband notch filter, binning of coefficients for frequencies below a threshold value, wherein the threshold value is based on narrowband notch amplitude, adaptively estimate narrowband notch filter coefficients by binning, wherein binning involves selecting coefficients based on frequency of occurrence, and provide estimated narrowband notch filter coefficients to the narrowband notch filter to suppress the narrow band interference from the first set of frequencies.

The present disclosure discloses a method of adaptively determining presence of narrowband interference. The method comprises digitizing an incoming digitally modulated (DM) signal at a predetermined sampling frequency, wherein the DM signal comprises beacons and interference. The method comprises generating a first set of frequencies from digitized DM signal and estimating frequency components from the first set of frequencies. The method comprises providing a first set of coefficients to a narrowband notch filter. The method comprises binning of coefficients for frequencies below a threshold value, wherein the threshold value is based on narrowband notch amplitude. The method comprises adaptively estimating narrowband notch filter coefficients by binning, wherein binning involves selecting coefficients based on frequency of occurrence. The method comprises providing the estimated narrowband notch filter coefficients to the narrowband notch filter to suppress the narrow band interference from the first set of frequencies.

To further clarify advantages and features of the present disclosure, a more particular description of the disclosure will be rendered by reference to specific embodiments thereof, which is illustrated in the appended figures. It is to be appreciated that these figures depict only typical embodiments of the disclosure and are therefore not to be considered limiting of its scope. The disclosure will be described and explained with additional specificity and detail with the accompanying figures.

BRIEF DESCRIPTION OF THE FIGURES

The disclosure will be described and explained with additional specificity and detail with the accompanying figures in which.

Figure 1:
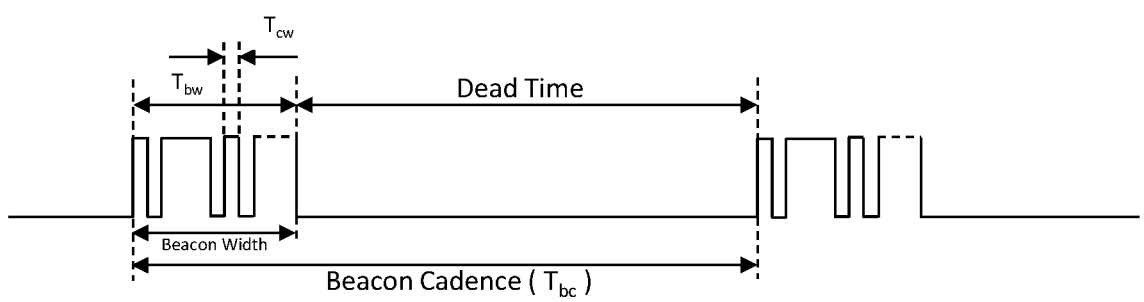
FIG. 1 illustrates an input signal received by an adaptive stylus receiver in accordance with an embodiment of the present disclosure.

Further, persons skilled in the art to which this disclosure belongs will appreciate that elements in the figures are illustrated for simplicity and may not have been necessarily drawn to scale. Furthermore, in terms of the construction, the stylus receiver and one or more components of the it may have been represented in the figures by conventional symbols, and the figures may show only those specific details that are pertinent to understanding the embodiments of the present disclosure so as not to obscure the figures with details that will be readily apparent to those of ordinary skill in the art having benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications to the disclosure, and such further applications of the principles of the disclosure as described herein being contemplated as would normally occur to one skilled in the art to which the disclosure relates are deemed to be a part of this disclosure.

It will be understood by those skilled in the art that the foregoing general description and the following detailed description are exemplary and explanatory of the disclosure and are not intended to be restrictive thereof.

In the present disclosure, relational terms such as first and second, and the like, may be used to distinguish one entity from the other, without necessarily implying any actual relationship or order between such entities.

The terms "comprises", "comprising", or any other variations thereof, are intended to cover a non-exclusive inclusion, such that a process or method that comprises a list of steps does not include only those steps but may include other steps not expressly listed or inherent to such a process or a method. Similarly, one or more elements or structures or components preceded by "comprises . . . a" does not, without more constraints, preclude the existence of other elements, other structures, other components, additional devices, additional elements, additional structures, or additional components. Appearances of the phrase "in an embodiment", "in another embodiment" and similar language throughout this specification may, but do not necessarily, all refer to the same embodiment.

Unless otherwise defined, all technical and scientific terms used herein have the same meaning as commonly understood by one of ordinary skill in the art to which this disclosure belongs. The components, methods, and examples provided herein are illustrative only and not intended to be limiting.

Embodiments of the present disclosure relates to an adaptive stylus receiver for adaptively determining presence of narrowband interference and its suppression and a method of adaptively determining presence of narrowband interference and its suppression.

FIG. 1 illustrates an input signal received by an adaptive stylus receiver in accordance with an embodiment of the present disclosure. The input signal is sent by a touchscreen panel and consists of a beacon sent at a certain cadence. The beacons in the uplink communication at the touchscreen panel side, is in the form of a Direct Sequence Spread Spectrum (DSSS) sequence of N chips corresponding to each bit, and there are M bits in each communication packet. Each chip is of a duration of $T_{ew}$ seconds (s) and hence the total duration is of $N \times M \times T_{ew}$ seconds (s). These beacons appear with a certain beacon cadence, $T_{be}$ seconds (s). Referring to FIG. 1 now, the figure illustrates a beacon with a width of $T_{bw}$ seconds and a beacon cadence of $T_{be}$ seconds. Apart from the beacon width $T_{bw}$ seconds, the rest of the time in the beacon cadence of $T_{be}$ seconds, is the dead time with respect to uplink communication and during this time downlink communication takes place from the stylus to the touchscreen panel. It is to be noted that in the input signal, the interferer is present both during the beacon width period as well as the dead time. In FIG. 1, the interferer is not shown.

Figure 2:
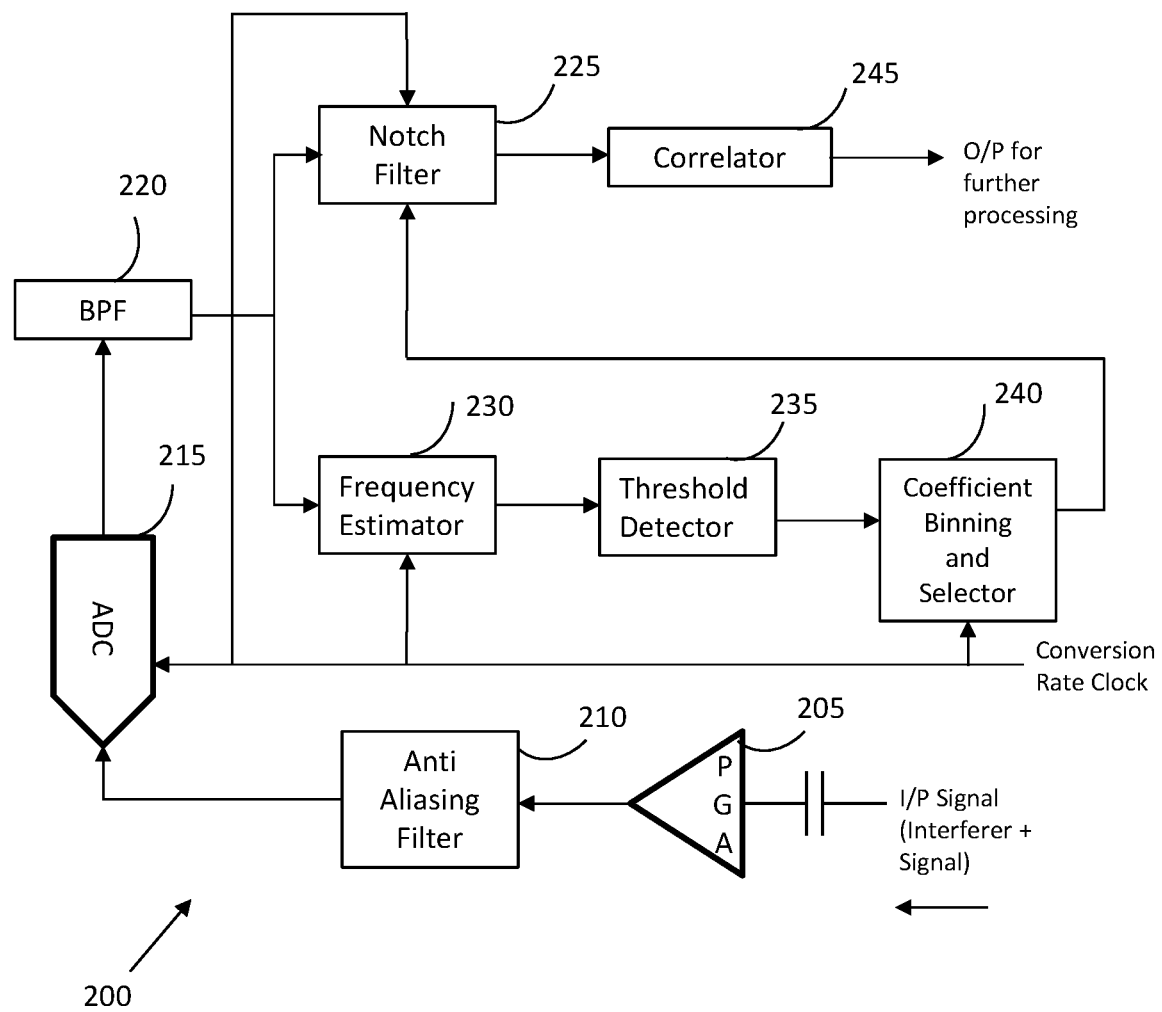
FIG. 2 illustrates a block diagram of the adaptive stylus receiver in accordance with an embodiment of the present disclosure.

FIG. 2 illustrates a block diagram of the adaptive stylus receiver 200 in accordance with an embodiment of the present disclosure. The input signal, also referred to as digitally modulated (DM) signal, is capacitively coupled to the adaptive stylus receiver 200. The DM signal from the touchscreen panel includes both the beacon and the interferer. The interferer is also referred interchangeably in the present disclosure as interference signal. A programmable gain amplifier (PGA) 205 provides the required gain to the input signal (interferer+signal). An anti-aliasing filter 210 is configured before an Analog to Digital Converter (ADC) 215 to attenuate the higher frequencies. Further, the DM signal is digitized by the ADC 215 at a predetermined sampling frequency, for example, $2/T_{ew}$ Hz sampling frequency (twice the chip rate). The $2/T_{ew}$ Hz sampling frequency is the conversion rate clocking frequency (conversion rate clock) provided to other subcomponents in the adaptive stylus receiver 200 including ADC 215, narrow band notch filter 225, frequency estimator 230, and coefficient binning and selector 240. The digitized DM signal is passed through a digital Band Pass Filter (BPF) 220 to remove DC component. The digital BPF 220 is configured to receive digitized DM signal and to generate a first set of frequencies from the digitized DM signal. The first set of frequencies is obtained by removing DC offset from the digitized DM signal, and attenuating frequencies above a cut-off frequency from the digitized DM signal. The digital BPF 220 output is presented to the narrowband notch filter 225 and the frequency estimator 230. The frequency estimator 230 is programmable for carrying out frequency detection and estimation through a frequency detection logic. The frequency detection logic adaptively determines presence of narrowband interference in the first set of frequencies. Determining the presence of the narrowband interference is further explained below.

Typically, the narrow band interferer frequency will be in the range of 150 kHz to 80 MHz and will not be known apriori by the stylus. The frequency detection logic estimates frequency components from the first set of frequencies and provides a first set of coefficients to the narrowband notch filter 225. A threshold detector 235 is configured to determine threshold value based on narrowband notch amplitude. The frequency detection logic is configured for binning of coefficients for frequencies below the threshold value. Further, the frequency detection logic adaptively estimates narrowband notch filter coefficients by binning Binning is performed by the coefficient binning and selector 240 and involves selecting coefficients based on frequency of occurrence. The frequency detection logic provides estimated narrowband notch filter coefficients to the narrowband notch filter 225 to suppress the narrow band interference from the first set of frequencies. Further, the narrowband notch filter 225 suppresses the narrowband interferer. In one embodiment, the coefficient of the narrowband notch filter 225 is determined using the Recursive Least Square (RLS) Algorithm. The RLS method of determining the notch coefficient is standard in any modern narrowband interferer rejection system. In the stylus environment, the notch coefficient becomes difficult to estimate in the presence of the beacon and the narrowband interferer. The received signal is a DSSS signal spread over 0 Hz to ($1/T_{ew}$ Hz) with the presence of the narrow band interferer whose frequency would be in the range 0 to $1/T_{ew}$ Hz since it has been sampled with at least $2/T_{ew}$ Hz clock. Thus, if the notch filter coefficient is not estimated correctly, the signal may be attenuated instead of the narrowband interferer.

The estimation of the narrowband notch filter coefficients is done in an adaptive manner and done in two phases.
 a) The estimation phase
 b) The application phase In the estimation phase, the narrowband notch filter coefficient is calculated and in the application phase the calculated coefficient is applied to the narrowband notch filter 225 during normal operation. The estimation phase is now described below.

The narrowband notch filter 225 includes a coefficient estimation timer to determine the coefficient estimation phase and the coefficient application phase. The coefficient estimation phase is time period/time periods during which interference or interference and beacon is present and the narrowband notch filter coefficients are dynamic. In one example, the coefficient estimation phase consists of a 4 ms window in which there is at least 3 ms of dead time, during which the unadulterated interferer frequency is available for the RLS algorithm. The RLS algorithm is applied on the received signal and the coefficients are binned at each sample which is the ADC sample period, provided the narrowband notch filter 225 output is below a certain threshold. The bin with the maximum numbers of hits is taken as the estimated coefficient of the narrowband notch filter 225.

The coefficient application phase is the time periods during which the estimated and binned narrowband notch filter coefficients are fixed and applied as coefficients to the narrowband notch filter 225. The frequency detection logic is configured to interchange between the coefficient estimation phase and application of estimated coefficients. It is to be noted that the frequency detection logic gets activated and the receiver goes into the coefficient estimation phase if beacon is not present after applying fixed coefficients to the narrowband notch filter 225 during the coefficient application phase. Once the narrowband notch filter 225 is provided with the coefficients pertaining to the interferer, the narrowband notch filter 225 suppresses the interferer.

Figure 3A:
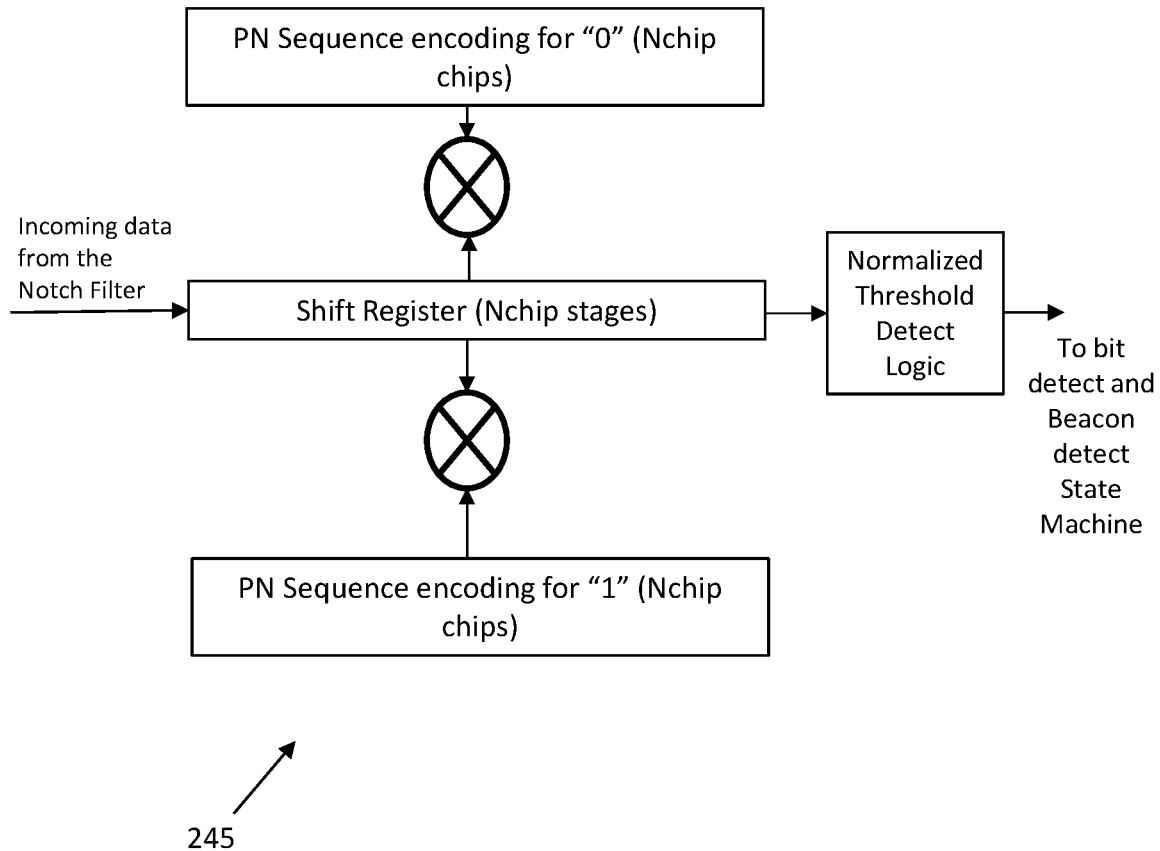
FIG. 3A illustrates a correlator that use a N chip PN sequence for correlation in accordance with an embodiment of the present disclosure.

The signal from the notch filter 225 is then provided to a correlator 245. The correlator 245 performs correlation or cross correlation which is a mathematical technique used to find similarity between two signals. In digital communication, correlation is used for demodulation and further processing, and involves sliding two sequences of signals against each other and then attempting to determine how closely the sequences resemble each other as they move with respect to each other. The adaptive stylus receiver 200 includes the correlator 245 to determine "0" and "1" in received DSSS signal, wherein correlation efficacy of the correlator 245 is determined by length of the DSSS signal's pseudo noise (PN) sequence used to encode the "0" and the "1". In the correlator 245, the interference suppressed signal is provided to a shift register and then correlated with a PN sequence encoding for "0" and with a PN sequence encoding for "1" as shown in FIG. 3A. The correlator 245 can be considered as a multiplier that multiplies the shift register contents with the PN sequence and using a normalized threshold detect logic for correlation. Each bit that is a '0' or '1' that is transmitted by the touchscreen panel is encoded as a PN sequence. Each PN sequence has N chips that are processed by the correlator 245, to decode the '0' or '1'. Upon correlation, a state machine performs bit detection and beacon detection. Typically, most stylus protocols use a fixed N chip PN sequence known apriori as shown in FIG. 3A. The N chips are chosen mathematically such that they have highest randomness. Increasing the chip PN sequence length consumes more processing time and power. However, it is to be noted that the correlation efficacy is improved by correlating with multiple bits encoded in the PN sequence, wherein increasing correlation PN sequence length with multiple bits improves the signal to noise ratio (SNR).

Figure 3B:
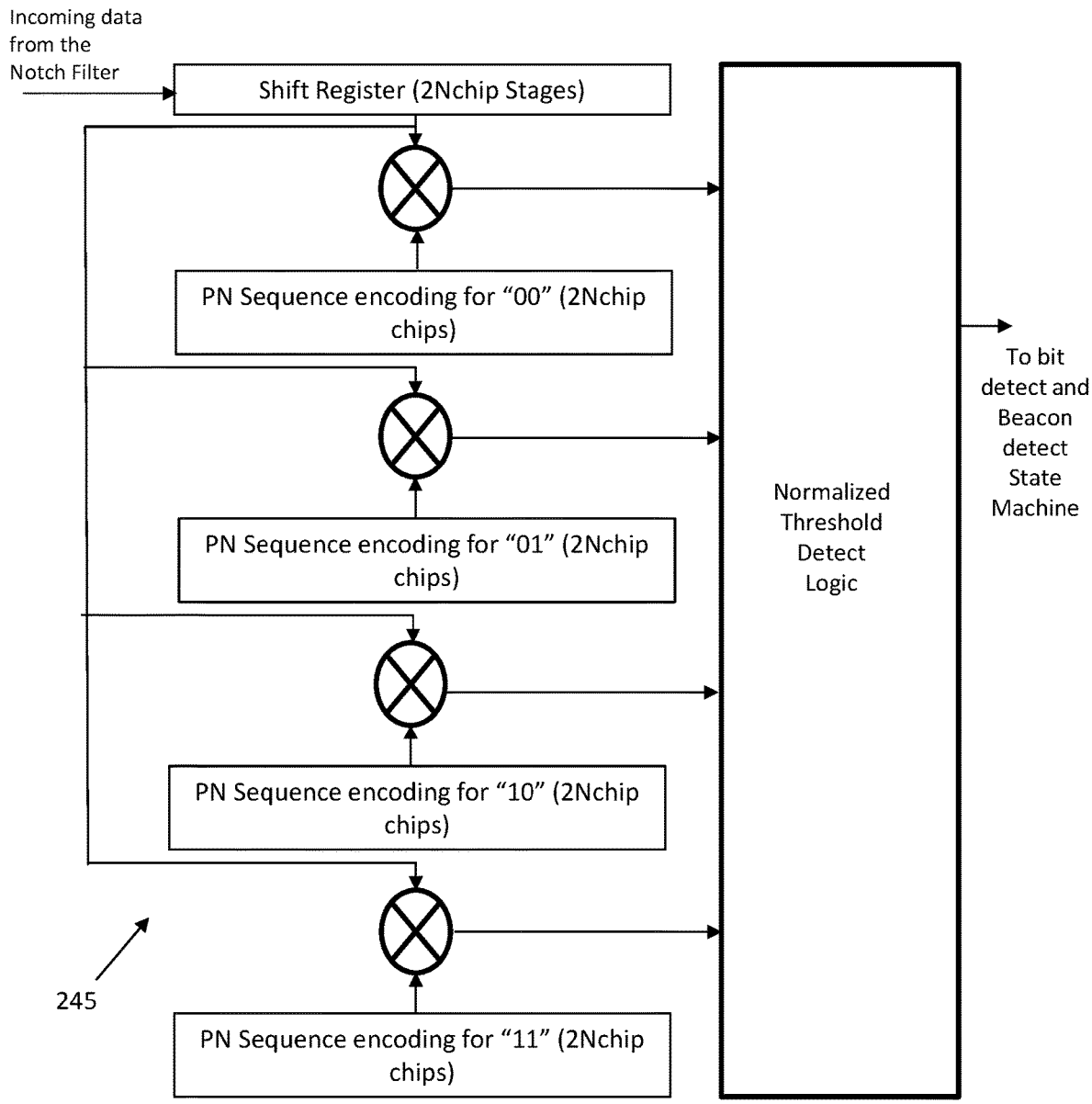
FIG. 3B illustrates a correlator that use a 2×N chip PN sequence for correlation in accordance with another embodiment of the present disclosure.

In one embodiment of the present disclosure, the spectrum spreading is improved without increasing the PN sequence length. This is done by taking two bits that are encoded by the PN sequence for decoding by the adaptive stylus receiver 200. Thus, the receiver's correlator 245 must correlate 2N chips, as shown in FIG. 3B. There are four combinations to be correlated by the adaptive stylus receiver thus increasing the power consumption and area of the correlator 245. However, the advantage of this method is that the SNR is improved by $\sqrt{2}$ with moderate increase in area of the correlator and the power consumption.

Figure 3C:
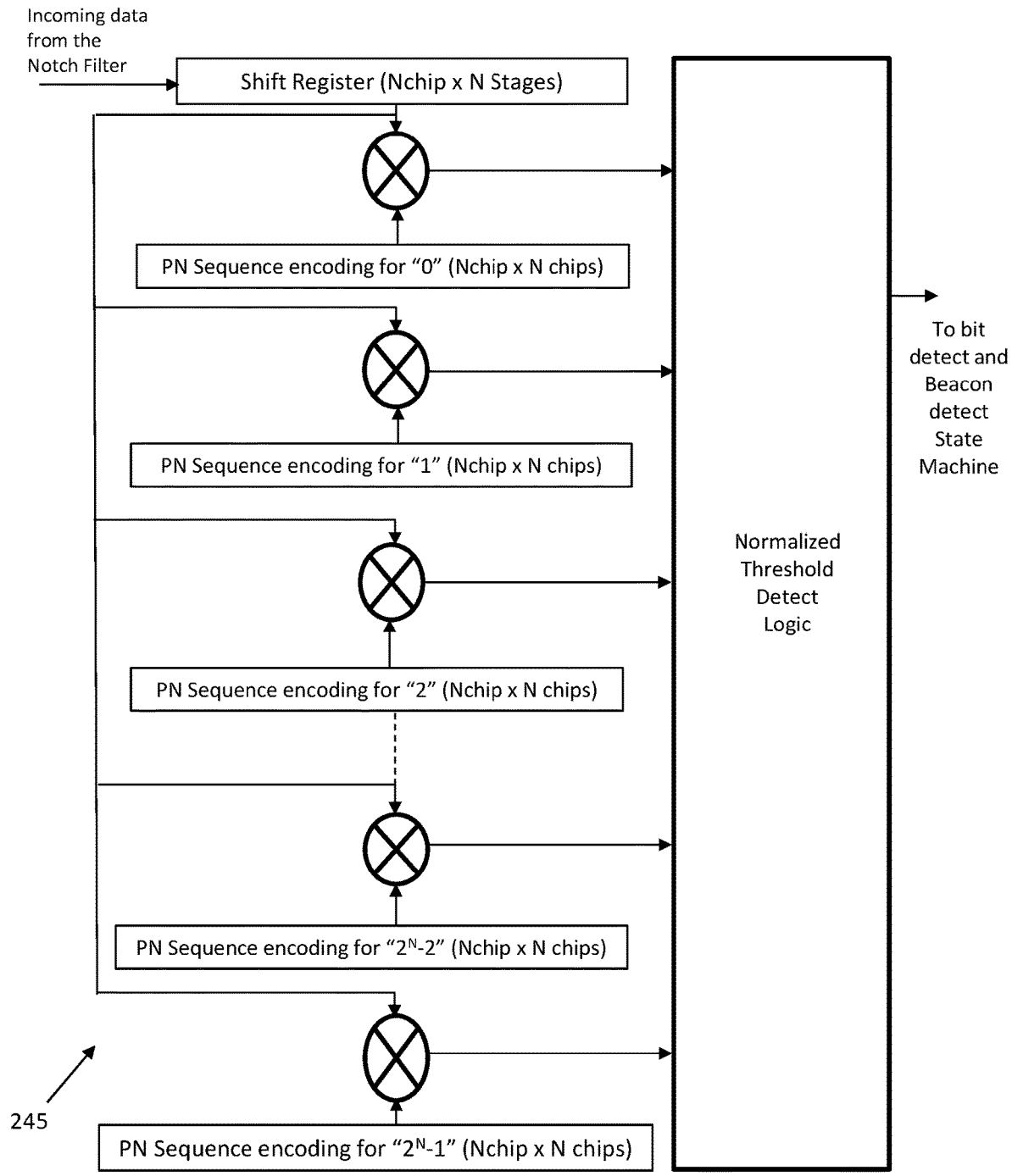
FIG. 3C illustrates a N-bit correlator in accordance with one embodiment of the present disclosure.

In another embodiment of the present disclosure, the correlation procedure can be extended to three bits and so on till N bits and is illustrated through an N-bit correlator 245 in FIG. 3C. However, it is to be noted that the number of combinations increases quite rapidly and becomes unmanageable in terms of power consumption as well as the area of implementation of the correlator 245. It is to be noted that the correlator 245 improves the SNR, independent of the narrowband notch filter 225 in the signal path.

In one embodiment, the adaptive stylus receiver 200 includes the PGA 200, the anti-aliasing filter 210, the ADC 215, a digital controller, the narrowband notch filter 225, and the correlator 245. The digital controller (not shown in FIG. 5) is configured to perform frequency estimation and detection of the narrowband interferer or the interference signal. The digital controller provides instructions for DC offsetting, frequency estimation, threshold detection, and binning of coefficients and selection of the coefficients. Further, the digital controller provides the binned coefficients of the narrowband interferer to the notch filter 225 to suppress the narrowband interferer. The digital controller implemented interferer determination and suppression is further explained below.

The adaptive stylus receiver 200 includes the ADC 215 to digitize an incoming digitally modulated (DM) signal at a predetermined sampling frequency, wherein the DM signal comprises beacons and interference. The adaptive stylus receiver 200 includes the digital controller that is configured to receive digitized DM signal and to generate a first set of frequencies from the digitized DM signal. The first set of frequencies is obtained by removing DC offset from the digitized DM signal, and attenuating frequencies above a cut-off frequency from the digitized DM signal. The digital controller is programmed with instructions to do frequency estimation. The frequency estimation is performed using a frequency detection logic which adaptively determines presence of narrowband interference in the first set of frequencies. The frequency detection logic is configured to estimate frequency components from the first set of frequencies, provide a first set of coefficients to a narrowband notch filter, binning of coefficients for frequencies below a threshold value, wherein the threshold value is based on narrowband notch amplitude, adaptively estimate narrowband notch filter coefficients by binning, wherein binning involves selecting coefficients based on frequency of occurrence, and provide estimated narrowband notch filter coefficients to the narrowband notch filter to suppress the narrow band interference from the first set of frequencies.

Figure 4:
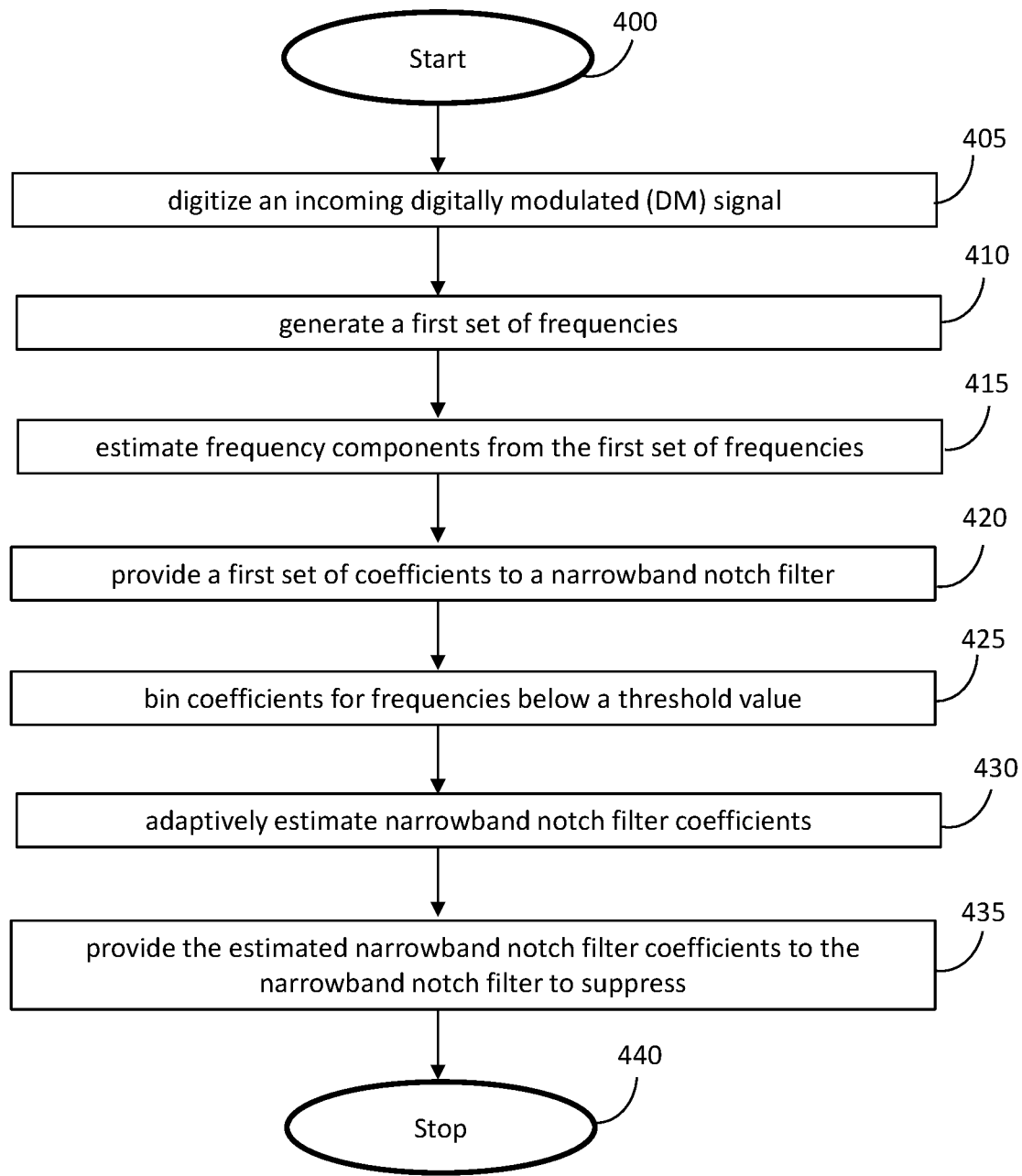
FIG. 4 illustrates a method of adaptively determining presence of narrowband interference in accordance with an embodiment of the present disclosure.

Referring to FIG. 4 now, FIG. 4 illustrates a method of adaptively determining presence of narrowband interference.

An input signal from a touchscreen panel, also referred to as digitally modulated (DM) signal, is capacitively coupled to an adaptive stylus receiver. The incoming DM signal comprises beacons and narrowband interferer.

The method begins at step 400.

Step 405 involves digitizing an incoming digitally modulated (DM) signal at a predetermined sampling frequency. Typically, the narrow band interferer frequency will be in the range of 150 kHz to 80 MHz and will not be known apriori by the stylus. The DM signal is digitized at a predetermined sampling frequency, for example, 2 MHz sampling frequency. The received signal is a DSSS signal spread over 0 Hz to 1 MHz with the presence of the narrow band interferer whose frequency would be in the range 0 to 1 MHz since it has been sampled with at least 2 MHz.

Step 410 involves generating a first set of frequencies from digitized DM signal. The first set of frequencies is obtained by removing DC offset from the digitized DM signal, and attenuating frequencies above a cut-off frequency from the digitized DM signal.

Step 415 involves estimating frequency components from the first set of frequencies. A frequency detection logic adaptively determines presence of narrowband interference in the first set of frequencies.

Step 420 involves providing a first set of coefficients to a narrowband notch filter.

Step 425 involves binning of coefficients for frequencies below a threshold value. The threshold value is based on narrowband notch amplitude.

Step 430 involves adaptively estimating narrowband notch filter coefficients by binning. Binning involves selecting coefficients based on frequency of occurrence. The frequency detection logic is configured to interchange between a coefficient estimation phase and a coefficient application phase. In the estimation phase, the narrowband notch filter coefficient is calculated and in the application phase the calculated coefficient is applied to the notch filter during normal operation. The coefficient estimation phase is time period/time periods during which interference/interference along with beacon is present and the narrowband notch filter coefficients are dynamic. The coefficient application phase is the time period/time periods during which the estimated and binned narrowband notch filter coefficients are fixed and applied as coefficients to the narrowband notch filter. The frequency detection logic is configured to transition back to the coefficient estimation phase which happens if beacon is not present after applying the fixed coefficients to the narrowband notch filter during the coefficient application phase.

Step 435 involves providing the estimated narrowband notch filter coefficients to the narrowband notch filter to suppress the narrow band interference from the first set of frequencies. Once the notch filter is provided with the coefficients pertaining to the interferer, the notch filter suppresses the interferer.

The method ends at Step 440.

In one embodiment, the method of adaptively determining presence of narrowband interference includes digitizing an incoming digitally modulated (DM) signal at a predetermined sampling frequency, wherein the DM signal comprises beacons and interference. A digital controller is programmed to provide instructions for generating a first set of frequencies from digitized DM signal and estimating frequency components from the first set of frequencies. The digital controller is programmed to provide instruction for providing a first set of coefficients to a narrowband notch filter. The digital controller is programmed to provide instruction for binning of coefficients for frequencies below a threshold value, wherein the threshold value is based on narrowband notch amplitude. The digital controller is programmed to provide instruction for adaptively estimating narrowband notch filter coefficients by binning, wherein binning involves selecting coefficients based on frequency of occurrence. The digital controller is programmed to provide instruction for providing the estimated narrowband notch filter coefficients to the narrowband notch filter to suppress the narrow band interference from the first set of frequencies.

Figure 5:
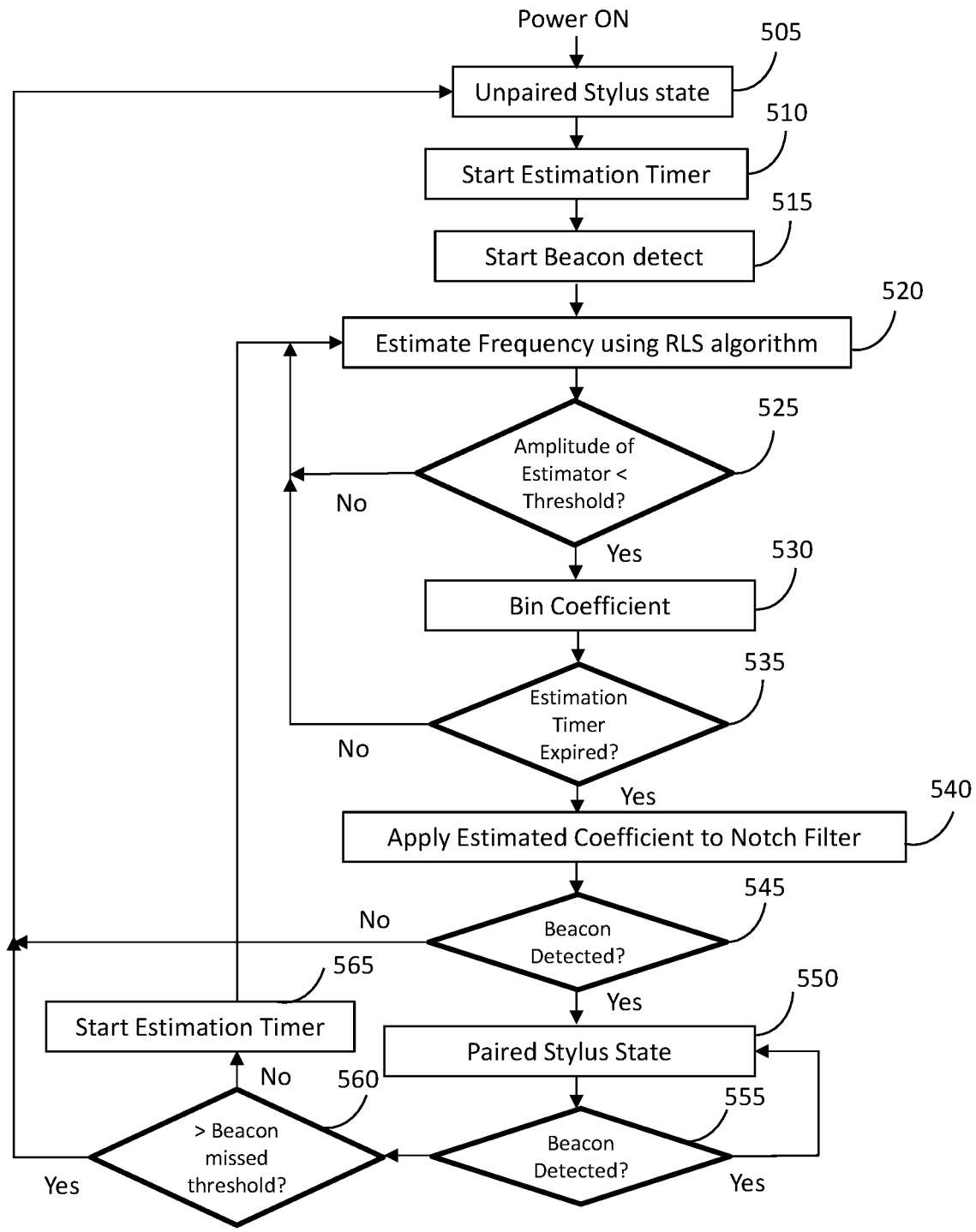
FIG. 5 illustrates a flowchart for adaptively determining presence of narrowband interference in accordance with an embodiment of the present disclosure.

FIG. 5 illustrates a flowchart for adaptively determining presence of narrowband interference in accordance with an embodiment of the present disclosure. At power ON, the stylus enters an unpaired state as depicted in step 505, wherein the stylus and the touchscreen panel are yet to handshake with each other and establish stable communication. At step 510, the coefficient estimation timer is started while the notch filter is configured to use the dynamically changing coefficient from the RLS algorithm. At step 515, the search for the transmitted beacon is initiated and at step 520 the frequency estimation of the signal starts at the output of the BPF. As depicted in decision box 525, if the amplitude at the output of the estimator is less than the programmed threshold for the estimated coefficient, the coefficient is binned at step 530. When the coefficient estimation timer expires, depicted by decision box 535, the binned coefficient is applied as a fixed coefficient to the notch filter at step 540, instead of the dynamic coefficient that was applied at the start. At step 545, if the beacon is detected with the applied fixed coefficient of the notch filter, the stylus enters the paired state at step 550. In this state, it is understood that the stylus and the touchscreen have established stable communication. If the beacon is not being detected after the application of the fixed coefficient the stylus remains in the unpaired state and continues estimating the interferer frequency and the notch filter coefficient. The stylus remains in the paired state as long as the beacon is detected. If the beacon is not detected in the paired state, as in step 555, the stylus starts the estimation timer and goes back to estimating the frequency of the interferer and the related coefficient of the notch filter. If the number of beacon detect miss in the paired state exceeds the number of beacon missed threshold, as depicted in step 560, the stylus goes into the unpaired state and starts the process of estimating frequency as in step 565, and the notch filter coefficient of the narrow band interferer.

The adaptive stylus receiver disclosed herein effectively determines presence of narrowband interference and suppresses it. In addition to the narrowband interference suppression, the adaptive stylus receiver also improves the signal to noise ratio without degradation in performance of the stylus.

While specific language has been used to describe the disclosure, any limitations arising on account of the same are not intended. As would be apparent to a person skilled in the art, various working modifications may be made to the method in order to implement the inventive concept as taught herein.

The figures and the description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

We claim:

1. An adaptive stylus receiver to adaptively determine presence of narrowband interference, the adaptive stylus receiver comprising:
   an analog-to-digital converter to digitize an incoming digitally modulated (DM) signal at a predetermined sampling frequency, wherein the DM signal comprises beacons and interference;
   a digital band pass filter configured to receive digitized DM signal and to generate a first set of frequencies from the digitized DM signal, wherein the first set of frequencies is obtained by,
     removing DC offset from the digitized DM signal, and
     attenuating frequencies above a cut-off frequency from the digitized DM signal; and
   a frequency detection logic to adaptively determine presence of narrowband interference in the first set of frequencies, the frequency detection logic configured to estimate frequency components from the first set of frequencies,
   provide a first set of coefficients to a narrowband notch filter,
   binning of coefficients for frequencies below a threshold value, wherein the threshold value is based on narrowband notch amplitude,
   adaptively estimate narrowband notch filter coefficients by binning, wherein binning involves selecting coefficients based on frequency of occurrence, and
   provide estimated narrowband notch filter coefficients to the narrowband notch filter to suppress the narrow band interference from the first set of frequencies.

2. The adaptive stylus receiver as claimed in claim 1, wherein the narrowband notch filter comprises:
   a coefficient estimation timer to determine a coefficient estimation phase and a coefficient application phase, wherein the frequency detection logic is configured to interchange between the coefficient estimation phase and application of estimated coefficients.

3. The adaptive stylus receiver as claimed in claim 2, wherein the coefficient estimation phase is a time period during which interference or interference and beacon is present and the narrowband notch filter coefficients are dynamic.

4. The adaptive stylus receiver as claimed in claim 2, wherein the coefficient application phase is the time period during which the estimated and binned narrowband notch filter coefficients are fixed and applied as coefficients to the narrowband notch filter.

5. The adaptive stylus receiver as claimed in claim 2, wherein the frequency detection logic gets activated and the receiver goes into the coefficient estimation phase if beacon is not present after applying fixed coefficients to the narrowband notch filter during the coefficient application phase.

6. The adaptive stylus receiver as claimed in claim 1, wherein the adaptive stylus receiver comprises:
   a programmable gain amplifier; and
   an anti-aliasing filter.

7. The adaptive stylus receiver as claimed in claim 1, wherein the digital modulation technique used is a direct sequence spread spectrum (DSSS).

8. The adaptive stylus receiver as claimed in claim 1, wherein the adaptive stylus receiver comprises a correlator to determine "0" and "1" in received DSSS signal, wherein correlation efficacy of the correlator is determined by length of the DSSS signal's pseudo noise (PN) sequence used to encode the "0" and the "1".

9. The adaptive stylus receiver as claimed in claim 8, wherein the correlation efficacy is improved by correlating with multiple bits encoded in the PN sequence, wherein increasing correlation PN sequence length with multiple bits improves the signal to noise ratio (SNR).

10. The adaptive stylus receiver as claimed in claim 8, wherein the correlator improves the SNR independent of the narrowband notch filter in the signal path.

11. A method of adaptively determining presence of narrowband interference, the method comprising:
    digitizing an incoming digitally modulated (DM) signal at a predetermined sampling frequency, wherein the DM signal comprises beacons and interference;
    generating a first set of frequencies from digitized DM signal;
    estimating frequency components from the first set of frequencies;
    providing a first set of coefficients to a narrowband notch filter;
    binning of coefficients for frequencies below a threshold value, wherein the threshold value is based on narrowband notch amplitude, adaptively estimating narrowband notch filter coefficients by binning, wherein binning involves selecting coefficients based on frequency of occurrence; and providing the estimated narrowband notch filter coefficients to the narrowband notch filter to suppress the narrow band interference from the first set of frequencies.

12. The method as claimed in claim 11, further comprising:
interchanging between a coefficient estimation phase and a coefficient application phase.

13. The method as claimed in claim 12, wherein the coefficient estimation phase is a time period during which interference is present and the narrowband notch filter coefficients are dynamic.

14. The method as claimed in claim 12, wherein the coefficient application phase is the time period during which the estimated and binned narrowband notch filter coefficients are fixed and applied as coefficients to the narrowband notch filter.

15. The method as claimed in claim 14, wherein transition back to the coefficient estimation phase happens if beacon is not present after applying the fixed coefficients to the narrowband notch filter during the coefficient application phase.

16. The method as claimed in claim 12, wherein the first set of frequencies is obtained by,
removing DC offset from the digitized DM signal, and
attenuating frequencies above a cut-off frequency from the digitized DM signal.

17. The method as claimed in claim 11, further comprising correlating to determine "0" and "1" in received DSSS signal, wherein correlation efficacy of the correlator is determined by length of the DSSS signal's pseudo noise (PN) sequence used to encode the "0" and the "1".

18. The method as claimed in claim 17, wherein the correlation efficacy is improved by correlating with multiple bits encoded in the PN sequence, wherein increasing correlation PN sequence length with multiple bits improves the signal to noise ratio (SNR).

\* \* \* \* \*